(12) United States Patent
Tadaoka et al.

(10) Patent No.: US 12,275,807 B2
(45) Date of Patent: Apr. 15, 2025

(54) RUBBER COMPOSITION AND CROSSLINKED RUBBER MOLDED PRODUCT

(71) Applicant: Sumitomo Rubber Industries, Ltd., Kobe (JP)

(72) Inventors: Hiroshi Tadaoka, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 266 days.

(21) Appl. No.: 17/980,021

(22) Filed: Nov. 3, 2022

(65) Prior Publication Data

US 2023/0135863 A1 May 4, 2023

(30) Foreign Application Priority Data

Nov. 4, 2021 (JP) ................. 2021-180403

(51) Int. Cl.
| | |
|---|---|
| C08K 5/47 | (2006.01) |
| A63B 37/00 | (2006.01) |
| A63B 37/02 | (2006.01) |
| C08F 136/06 | (2006.01) |
| C08K 3/22 | (2006.01) |
| C08K 5/098 | (2006.01) |
| C08K 5/375 | (2006.01) |
| C08L 9/00 | (2006.01) |
| C08K 5/372 | (2006.01) |

(52) U.S. Cl.
CPC ........ *C08F 136/06* (2013.01); *A63B 37/0003* (2013.01); *A63B 37/0051* (2013.01); *C08K 3/22* (2013.01); *C08K 5/098* (2013.01); *C08K 5/375* (2013.01); *C08K 5/47* (2013.01); *C08K 2003/2296* (2013.01); *C08K 5/372* (2013.01)

(58) Field of Classification Search
None
See application file for complete search history.

(56) References Cited

U.S. PATENT DOCUMENTS

| | | | | |
|---|---|---|---|---|
| 1,847,514 | A * | 3/1932 | Herz ................ | C07D 277/72 548/173 |
| 2004/0230005 | A1* | 11/2004 | Voorheis ............ | A63B 37/0024 525/256 |
| 2004/0248669 | A1 | 12/2004 | Kim et al. | |
| 2004/0248670 | A1 | 12/2004 | Okamoto et al. | |
| 2014/0100058 | A1* | 4/2014 | Mikura ................ | C08L 9/00 473/372 |
| 2022/0193494 | A1* | 6/2022 | Nagakura .......... | A63B 37/0063 |
| 2022/0411606 | A1* | 12/2022 | Tadaoka ................ | C08K 3/22 |
| 2023/0033200 | A1* | 2/2023 | Tadaoka ................ | C08K 5/14 |
| 2023/0064604 | A1* | 3/2023 | Tadaoka ................ | C08K 5/098 |

FOREIGN PATENT DOCUMENTS

| | | |
|---|---|---|
| JP | 2005-647 A | 1/2005 |
| JP | 2005-657 A | 1/2005 |

* cited by examiner

*Primary Examiner* — David J Buttner
(74) *Attorney, Agent, or Firm* — Birch, Stewart, Kolasch & Birch, LLP (57) ABSTRACT

An object of the present disclosure is to provide a rubber composition containing an organic sulfur compound from which a molded product having a high hardness can be obtained. The present disclosure provides a rubber composition containing (a) a base rubber, (b) a co-crosslinking agent, (c) a crosslinking initiator, (d) a benzothiazole derivative, and (e) an organic sulfur compound, wherein (d) the benzothiazole derivative is a compound represented by the formula (1) and/or a compound represented by the formula (2).

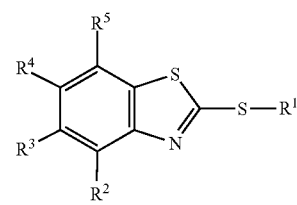

(1)

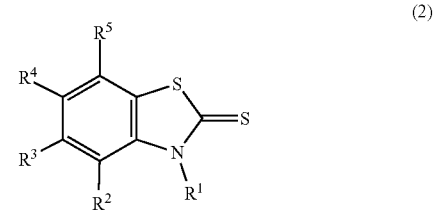

(2)

[$R^1$ represents a hydrogen atom, an alkyl group having 1 to 8 carbon atoms, an aryl group having 4 to 14 carbon atoms, or a metal atom,
$R^2$ to $R^5$ are identical to or different from each other, and represent an electron-withdrawing group or a hydrogen atom, and at least one of $R^3$ to $R^5$ is an electron-withdrawing group.]

20 Claims, 6 Drawing Sheets

RUBBER COMPOSITION AND CROSSLINKED RUBBER MOLDED PRODUCT

FIELD OF THE INVENTION

The present disclosure relates to a rubber composition, and particularly relates to a rubber composition containing an organic sulfur compound and crosslinking in a short time.

DESCRIPTION OF THE RELATED ART

In light of good resilience, a rubber composition containing a base rubber, a co-crosslinking agent and a crosslinking initiator is widely used as a material for forming a core of a golf ball.

For example, JP 2005-000647 A discloses a golf ball comprising a composition containing an unsaturated polymer, a crosslinking agent, a peptizer which is a non-metal salt of an organic sulfur compound, and an accelerator selected from the group consisting of 2-mercaptobenzothiazole and a salt of 2-mercaptobenzothiazole.

In addition, JP 2005-000657 A discloses a golf ball comprising a composition containing an unsaturated polymer, a crosslinking agent, a peptizer, and a vulcanization accelerator, wherein the vulcanization accelerator is selected from the group consisting of 2-mercaptobenzothiazole and a salt of 2-mercaptobenzothiazole.

SUMMARY OF THE INVENTION

Although various rubber compositions have been proposed, there is a problem that a conventional rubber composition containing an organic sulfur compound requires a long time for crosslinking. In addition, crosslinking cannot be effectively formed in the rubber composition containing the organic sulfur compound, thus a large amount of a co-crosslinking agent is necessary to increase the hardness of the cured product.

The present disclosure has been achieved in view of the above circumstances, and an object of the present disclosure is to provide a rubber composition containing an organic sulfur compound from which a molded product having a high hardness is obtained.

The present disclosure that has solved the above problems provides a rubber composition containing (a) a base rubber, (b) a co-crosslinking agent, (c) a crosslinking initiator, (d) a benzothiazole derivative, and (e) an organic sulfur compound, wherein (d) the benzothiazole derivative includes a compound represented by the formula (1) and/or a compound represented by the formula (2).

(1)

(2)

[$R^1$ represents a hydrogen atom, an alkyl group having 1 to 8 carbon atoms, an aryl group having 4 to 14 carbon atoms, or a metal atom, $R^2$ to $R^5$ are identical to or different from each other, and represent an electron-withdrawing group or a hydrogen atom, and at least one of $R^3$ to $R^5$ is an electron-withdrawing group.]

According to the present disclosure, the rubber composition containing an organic sulfur compound provides a molded product having a high hardness.

DESCRIPTION OF THE PREFERRED EMBODIMENT

[Rubber Composition]

The present disclosure provides a rubber composition containing (a) a base rubber, (b) a co-crosslinking agent, (c) a crosslinking initiator, (d) a benzothiazole derivative, and (e) an organic sulfur compound, wherein (d) the benzothiazole derivative includes a compound represented by the formula (1) and/or a compound represented by the formula (2).

According the present disclosure, blending (d) the specific benzothiazole derivative in the rubber composition effectively forms the crosslinking, and shortens the time required for crosslinking the rubber composition. In addition, since the crosslinking is effectively formed, a molded product having a high hardness is obtained even if a small amount of (b) the co-crosslinking agent is used.

Next, the materials used for the rubber composition will be explained.

(a) Base Rubber

As (a) the base rubber, a natural rubber and/or a synthetic rubber can be used. Examples of the synthetic rubber include a diene rubber such as polybutadiene rubber (BR), polyisoprene rubber (IR), styrene-polybutadiene rubber (SBR), chloroprene rubber (CR), butyl rubber (IIR), and acrylonitrile-butadiene rubber (NBR); and a non-diene rubber such as ethylene-propylene rubber (EPM), ethylene-propylene-diene rubber (EPDM), urethane rubber, silicone rubber, acrylic rubber, epichlorohydrin rubber, polysulfide rubber, fluorinated rubber, and chlorosulfonated polyethylene rubber. The rubber may be used solely, or two or more of them may be used in combination.

(a) The base rubber preferably contains the natural rubber and/or the diene rubber. The total amount of the natural rubber and/or the diene rubber in (a) the base rubber is preferably 50 mass % or more, more preferably 70 mass % or more, and even more preferably 90 mass % or more. It is also preferable that (a) the base rubber consists of the natural rubber and/or the diene rubber.

(a) The base rubber preferably includes a polybutadiene rubber, and particularly preferably includes a high-cis polybutadiene having a cis-1,4 bond in an amount of 40 mass % or more, preferably 80 mass % or more, and more preferably 90 mass % or more in view of its superior resilience. The amount of the high-cis polybutadiene in (a) the base rubber is preferably 50 mass % or more, more preferably 70 mass % or more.

The amount of the 1,2-vinyl bond in the high-cis polybutadiene is preferably 2.0 mass % or less, more preferably 1.7 mass % or less, and even more preferably 1.5 mass % or less. If the amount of the 1,2-vinyl bond is excessively great, the resilience may be lowered.

The high-cis polybutadiene is preferably a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The Mooney viscosity ($ML_{1+4}$ (100° C.)) of the high-cis polybutadiene is preferably 30 or more, more preferably 32 or more, and even more preferably 35 or more, and is preferably 140 or less, more preferably 120 or less, even more preferably 100 or less, and most preferably 80 or less. It is noted that the Mooney viscosity ($ML_{1+4}$ (100° C.)) in the present disclosure is a value measured according to JIS K6300 using an L rotor under the conditions of: a preheating time of 1 minute; a rotor revolution time of 4 minutes; and a temperature of 100° C.

(b) Co-crosslinking agent (b) The co-crosslinking agent has an action of crosslinking a rubber molecule by graft polymerization to a base rubber molecular chain. (b) The co-crosslinking agent preferably includes an $\alpha,\beta$-unsaturated carboxylic acid having 3 to 8 carbon atoms and/or a metal salt thereof, more preferably the metal salt of the $\alpha,\beta$-unsaturated carboxylic acid having 3 to 8 carbon atoms. The $\alpha,\beta$-unsaturated carboxylic acid used as (b) the co-crosslinking agent preferably has 3 to 8 carbon atoms, more preferably has 3 to 6 carbon atoms, and even more preferably has 3 or 4 carbon atoms. It is noted that the $\alpha,\beta$-unsaturated carboxylic acid having 3 to 8 carbon atoms and/or the metal salt thereof may be used solely, or two or more of them may be used in combination.

Examples of the $\alpha,\beta$-unsaturated carboxylic acid having 3 to 8 carbon atoms include acrylic acid, methacrylic acid, fumaric acid, maleic acid and crotonic acid. When the rubber composition contains only the $\alpha,\beta$-unsaturated carboxylic acid having 3 to 8 carbon atoms as the co-crosslinking agent, the rubber composition preferably further contains (f) a metal compound. Neutralizing the $\alpha,\beta$-unsaturated carboxylic acid having 3 to 8 carbon atoms with the metal compound in the rubber composition provides substantially the same effect as using the metal salt of the $\alpha,\beta$-unsaturated carboxylic acid having 3 to 8 carbon atoms as the co-crosslinking agent.

Examples of the metal ion constituting the metal salt of the $\alpha,\beta$-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ion such as tin and zirconium. The above metal component may be used solely or as a mixture of at least two of them. Among them, the divalent metal ion such as magnesium, calcium, zinc, barium and cadmium is preferably used as the metal component. This is because if the divalent metal salt of the $\alpha,\beta$-unsaturated carboxylic acid having 3 to 8 carbon atoms is used, a metal crosslinking easily generates between the rubber molecules. Especially, the divalent metal salt is preferably the zinc salt of the $\alpha,\beta$-unsaturated carboxylic acid having 3 to 8 carbon atoms, more preferably zinc acrylate, because use of such divalent metal salt enhances the resilience of the obtained golf ball. It is noted that when the $\alpha,\beta$-unsaturated carboxylic acid having 3 to 8 carbon atoms is used together with the metal salt thereof as the co-crosslinking agent, (f) the metal compound may be used as an optional component.

When the metal is a divalent or trivalent metal, the metal salt of (b) the $\alpha,\beta$-unsaturated carboxylic acid having 3 to 8 carbon atoms may further include other carboxylic acid than the $\alpha,\beta$-unsaturated carboxylic acid having 3 to 8 carbon atoms, as the carboxylic acid moiety. Examples of the other carboxylic acid include a saturated carboxylic acid such as caprylic acid, capric acid, lauric acid, myristic acid, palmitic acid, stearic acid, arachidic acid, and behenic acid; and an unsaturated carboxylic acid such as palmitoleic acid, oleic acid, linoleic acid, linolenic acid, and arachidonic acid.

The amount of (b) the co-crosslinking agent is preferably more than 18 parts by mass, more preferably 20 parts by mass or more, even more preferably 25 parts by mass or more, and most preferably 27 parts by mass or more, and is preferably 50 parts by mass or less, more preferably 45 parts by mass or less, and even more preferably 35 parts by mass or less, with respect to 100 parts by mass of (a) the base rubber. If the amount of (b) the co-crosslinking agent is more than 18 parts by mass, the member formed from the rubber composition is made to have an appropriate hardness with a small amount of (c) the crosslinking initiator. On the other hand, if the amount of (b) the co-crosslinking agent is 50 parts by mass or less, the member formed from the rubber composition is not excessively hard.

(c) Crosslinking Initiator

(c) The crosslinking initiator is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. These organic peroxides may be used solely or as a mixture of at least two of them. Among them, dicumyl peroxide is preferably used.

The one minute half-life temperature of (c) the crosslinking initiator is preferably 120° C. or more, more preferably 140° C. or more, and even more preferably 150° C. or more, and is preferably 200° C. or less, more preferably 190° C. or less, and even more preferably 180° C. or less.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, even more preferably 2.0 parts by mass or less, and most preferably 0.9 part by mass or less, with respect to 100 parts by mass of (a) the base rubber. If the amount of (c) the crosslinking initiator is 0.2 part by mass or more, the crosslinked rubber molded product formed from the rubber composition is not excessively soft, and thus the resilience is better, and if the amount of (c) the crosslinking initiator is 5.0 parts by mass or less, the crosslinked rubber molded product formed from the rubber composition has an appropriate hardness, and thus the resilience and the durability are better.

(d) Benzothiazole Derivative (d) The benzothiazole derivative used in the present disclosure will be explained. Examples of (d) the benzothiazole derivative includes a compound represented by the formula (1), and a compound represented by the formula (2). Blending (d) the benzothiazole derivative effectively forms the crosslinking, and shortens the time required for crosslinking the rubber composition. In addition, since the crosslinking is effectively formed, a molded product having a high hardness is obtained with a small amount of (b) the co-crosslinking agent.

[$R^1$ represents a hydrogen atom, an alkyl group having 1 to 8 carbon atoms, an aryl group having 4 to 14 carbon atoms, or a metal atom, $R^2$ to $R^5$ are identical to or different from each other, and represent an electron-withdrawing group or a hydrogen atom, and at least one of $R^3$ to $R^5$ is an electron-withdrawing group.] Herein, "at least one of $R^3$ to $R^5$" means any one of $R^3$, $R^4$ or $R^5$, any combination of two of $R^3$, $R^4$ and $R^5$, or all of $R^3$, $R^4$ and $R^5$.

Examples of the alkyl group having 1 to 8 carbon atoms represented by $R^1$ in the formula (1) or the formula (2) include a linear alkyl group, a branched alkyl group, and a cyclic alkyl group. The alkyl group preferably has 1 or more carbon atoms, and preferably has 6 or less carbon atoms, more preferably has 4 or less carbon atoms.

Examples of the linear alkyl group include a methyl group, an ethyl group, a n-propyl group, a n-butyl group, and a n-pentyl group.

Examples of the branched alkyl group include an isopropyl group, an isobutyl group, a s-butyl group, a t-butyl group, and an isopentyl group.

Examples of the cyclic alkyl group include a cyclopropyl group, a cyclobutyl group, a cyclopentyl group, and a cyclohexyl group.

The aryl group having 4 to 14 carbon atoms represented by $R^1$ preferably has 12 or less carbon atoms, more preferably has 10 or less carbon atoms. Examples of the aryl group include a phenyl group and a naphthyl group.

Examples of the metal atom represented by $R^1$ include sodium, potassium, lithium, magnesium, calcium, zinc, barium, and cadmium.

$R^1$ is preferably the hydrogen atom or the alkyl group having 1 to 8 carbon atoms, and more preferably the hydrogen atom.

The electron-withdrawing group represented by $R^2$ to $R^5$ is a substituent group whose force withdrawing electron from the carbon atom which the substituent group is bonding is greater than that of a hydrogen atom. Examples of the electron-withdrawing group represented by $R^2$ to $R^5$ include a halogen group, a perfluoroalkyl group, a halogenated alkyl group, an alkylcarbonyl group, an alkoxycarbonyl group, a pentafluorosulfanyl group (—$SF_5$), a nitro group (—$NO_2$), a cyano group (—CN), a carboxy group (—COOH), an aldehyde group (—CHO), a sulfanyl group (—SH), a sulfo group (—$SO_3H$), an alkylsulfonyl group, an alkoxysulfonyl group, and a perfluoroalkylsulfonyl group.

Examples of the halogen group include a fluoro group (—F), a chloro group (—Cl), and a bromo group (—Br).

Examples of the perfluoroalkyl group include a trifluoromethyl group (—$CF_3$), a pentafluoroethyl group (—$C_2F_5$), and a heptafluoropropyl group (—$C_3F_7$).

Examples of the halogenated alkyl group include a trichloromethyl group (—$CCl_3$), and a monochloromethyl group (—$CH_2Cl$).

Examples of the alkylcarbonyl group include an acetyl group (—$COCH_3$), and propionyl group (—$COC_2H_5$).

Examples of the alkoxycarbonyl group include a methoxycarbonyl group (—$COOCH_3$), and an ethoxycarbonyl group (—$COOC_2H_5$).

Examples of the alkylsulfonyl group include a methylsulfonyl group (—$SO_2CH_3$), and an ethylsulfonyl group (—$SO_2C_2H_5$).

Examples of the alkoxysulfonyl group include a methoxysulfonyl group (—$SO_2OCH_3$), and an ethoxysulfonyl group (—$SO_2OC_2H_5$).

Examples of the perfluoroalkylsulfonyl group include a trifluoromethylsulfonyl group (—$SO_2CF_3$), and a pentafluoroethylsulfonyl group (—$SO_2C_2F_5$).

The electron-withdrawing group represented by $R^2$ to $R^5$ is preferably one member selected from the group consisting of the halogen group, the perfluoroalkyl group, and the pentafluorosulfanyl group.

(d) The benzothiazole derivative is preferably a compound represented by the formula (1-1), (1-2), (2-1) or (2-2). If the electron-withdrawing group is at 5-position or 6-position, the crosslinking-forming is further accelerated, and a molded product having a higher hardness is obtained.

(1-1)

(1-2)

(2-1)

(2-2)

[In the formulae (1-1) and (2-1), $R^3$ represents an electron-withdrawing group.

In the formulae (1-2) and (2-2), $R^4$ represents an electron-withdrawing group.]

Examples of the electron-withdrawing group represented by $R^3$ and $R^4$ in the formula (1-1), (1-2), (2-1) or (2-2) include the electron-withdrawing group represented by $R^3$ and $R^4$ in the formulae (1) and (2). The electron-withdrawing group represented by $R^3$ and $R^4$ in the formula (1-1), (1-2), (2-1) or (2-2) is preferably one member selected from the group consisting of the halogen group, the perfluoroalkyl group, and the pentafluorosulfanyl group.

The amount of (d) the benzothiazole derivative is preferably 0.01 part by mass or more, more preferably 0.1 part by mass or more, and even more preferably 0.5 part by mass or more, and is preferably 20 parts by mass or less, more preferably 10 parts by mass or less, and even more preferably 5 parts by mass or less, with respect to 100 parts by mass of (a) the base rubber. If the amount of (d) the benzothiazole derivative is 0.01 part by mass or more, the resilience is further enhanced, and if the amount of (d) the benzothiazole derivative is 20 parts by mass or less, the softness is better.

(e) Organic Sulfur Compound (e) The organic sulfur compound excludes (d) the benzothiazole derivative. Examples of (e) the organic sulfur compound include at least one compound selected from the group consisting of thiophenols, thionaphthols, polysulfides, thiurams, thiocarboxylic acids, dithiocarboxylic acids, sulfenam ides, dithiocarbamates, thiazoles, and metal salts thereof. As (e) the organic sulfur compound, the organic sulfur compound having a thiol group (—SH), or the metal salt thereof is preferable, thiophenols, thionaphthols, or the metal salt thereof are more preferable.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol and pentaiodothiophenol; and metal salts thereof. As the metal salt, zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Among them, 2-thionaphthol, 1-thionaphthol, and metal salts thereof are preferable. As the metal salt, a divalent metal salt is preferable, zinc salt is more preferable. Specific examples of the metal salt include zinc salt of 1-thionaphthol and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide; thiuram disulfides such as tetramethylthiuram disulfide, tetraethylthiuram disulfide and tetrabutylthiuram disulfide; and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

(e) The organic sulfur compound may be used solely or as a mixture of at least two of them. As (e) the organic sulfur compound, the thiophenols and/or the metal salts thereof, the thionaphthols and/or the metal salts thereof, the diphenyl disulfides, and the thiuram disulfides are preferable, 2,4- dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, bis(pentabromophenyl) disulfide, and metal salts thereof are more preferable.

The amount of (e) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and thus the resilience of the crosslinked rubber molded product may not be enhanced. In addition, if the amount of (e) the organic sulfur compound is more than 5.0 parts by mass, the obtained crosslinked rubber molded product has a great compression deformation amount and thus the resilience thereof may be lowered.

(f) Metal Compound

The rubber composition may further contain (f) a metal compound. (f) The metal compound is preferably a metal compound capable of neutralizing (b) the α,β-unsaturated carboxylic acid having 3 to 8 carbon atoms in the rubber composition. Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (f) the metal compound, the divalent metal compound is preferable, the zinc compound is more preferable. This is because the divalent metal compound reacts with the α,β-unsaturated carboxylic acid having 3 to 8 carbon atoms to form a metal crosslinking. In addition, if the zinc compound is used, the obtained crosslinked rubber molded product has higher resilience. (f) The metal compound may be used solely, or at least two of them may be used in combination. The amount of (f) the metal compound can be appropriately adjusted.

When (f) the metal compound is contained, a ratio (M2/(M1×valent)) of a mole M2 of (d) the benzothiazole derivative to a product obtained by multiplying a mole M1 of (f) the metal compound by a valent of the metal included in (f) the metal compound is preferably 0.01 or more, more preferably 0.02 or more, and even more preferably 0.04 or more, and is preferably 1.0 or less, more preferably 0.5 or less, and even more preferably 0.1 or less.

(g) Carboxylic Acid and/or Salt thereof

The rubber composition may further contain (g) a carboxylic acid and/or a salt thereof. If the rubber composition contains (g) the carboxylic acid and/or the salt thereof, the hardness distribution of the obtained crosslinked rubber molded product can be controlled. Examples of (g) the carboxylic acid and/or the salt thereof include an aliphatic carboxylic acid, an aliphatic carboxylic acid salt, an aromatic carboxylic acid and an aromatic carboxylic acid salt. (g) The carboxylic acid and/or the salt thereof may be used solely, or as a mixture of two or more of them. It is noted that (g) the carboxylic acid and/or the salt thereof excludes the α,β-unsaturated carboxylic acid having 3 to 8 carbon atoms and the metal salt thereof used as (b) the co-crosslinking agent.

The aliphatic carboxylic acid may be either a saturated aliphatic carboxylic acid (hereinafter sometimes referred to as "saturated fatty acid") or an unsaturated aliphatic carboxylic acid (hereinafter sometimes referred to as "unsaturated fatty acid"). In addition, the aliphatic carboxylic acid may have a branched or cyclic structure. The saturated fatty acid preferably has 6 or more carbon atoms, and preferably has 24 or less carbon atoms, more preferably has 18 or less carbon atoms, and even more preferably has 13 or less carbon atoms. The unsaturated fatty acid preferably has 6 or more carbon atoms, more preferably has 7 or more carbon atoms, and even more preferably has 8 or more carbon atoms, and preferably has 24 or less carbon atoms, more preferably has 18 or less carbon atoms, and even more preferably has 13 or less carbon atoms.

Examples of the aromatic carboxylic acid include a carboxylic acid having a benzene ring in the molecule, and a carboxylic acid having an aromatic heterocycle in the molecule. The aromatic carboxylic acid may be used solely, or two or more of them may be used in combination. Examples of the carboxylic acid having the benzene ring include an aromatic carboxylic acid having a carboxyl group directly bonding to a benzene ring, an aromatic-aliphatic carboxylic acid having an aliphatic carboxylic acid bonding to a benzene ring, a polynuclear aromatic carboxylic acid having a carboxyl group directly bonding to a fused benzene ring, and a polynuclear aromatic-aliphatic carboxylic acid having an aliphatic carboxylic acid bonding to a fused benzene ring. Examples of the carboxylic acid having the aromatic heterocycle include a carboxylic acid having a carboxyl group directly bonding to an aromatic heterocycle.

As the aliphatic carboxylic acid salt or aromatic carboxylic acid salt, a salt of the above mentioned aliphatic carboxylic acid or aromatic carboxylic acid can be used. Examples of the cation component of these salts include a metal ion, an ammonium ion, and an organic cation. The cation component may be used solely, or two or more of them may be used in combination. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; other ion such as tin, zirconium and titanium. Among them, the metal ion is preferably the divalent metal ion, more preferably magnesium, zinc, or calcium.

The organic cation is a cation having a carbon chain. The organic cation is not particularly limited, and examples thereof include an organic ammonium ion. Examples of the organic ammonium ion include a primary ammonium ion such as stearyl ammonium ion, hexyl ammonium ion, octyl ammonium ion and 2-ethylhexyl ammonium ion; a secondary ammonium ion such as dodecyl(lauryl) ammonium ion and octadecyl(stearyl) ammonium ion; a tertiary ammonium ion such as trioctyl ammonium ion; and a quaternary ammonium ion such as dioctyldimethyl ammonium ion and distearyldimethyl ammonium ion. These organic cations may be used solely, or two or more of them may be used in combination.

Examples of the aliphatic carboxylic acid and/or the salt thereof include a saturated fatty acid and/or a salt thereof, and an unsaturated fatty acid and/or a salt thereof. The saturated fatty acid and/or the salt thereof is preferable, and caprylic acid (octanoic acid), pelargonic acid (nonanoic acid), capric acid (decanoic acid), lauric acid, myristic acid, palmitic acid, stearic acid, behenic acid, and their potassium salt, magnesium salt, calcium salt, aluminum salt, zinc salt, iron salt, copper salt, nickel salt and cobalt salt, are preferable. As the unsaturated fatty acid and/or the salt thereof, palmitoleic acid, oleic acid, linoleic acid, arachidonic acid, and their potassium salt, magnesium salt, calcium salt, aluminum salt, zinc salt, iron salt, copper salt, nickel salt and cobalt salt, are preferable.

As the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thenoic acid, and their potassium salt, magnesium salt, calcium salt, aluminum salt, zinc salt, iron salt, copper salt, nickel salt and cobalt salt, are particularly preferable.

For example, the amount of (g) the carboxylic acid and/or the salt thereof is preferably 1 part by mass or more, more preferably 2 parts by mass or more, and even more preferably 3 parts by mass or more, and is preferably 30 parts by mass or less, more preferably 20 parts by mass or less, and even more preferably 15 parts by mass or less, with respect to 100 parts by mass of (a) the base rubber.

Other Components

The rubber composition may contain additives such as a pigment, a filler for adjusting weight or the like, an antioxidant, a peptizing agent, and a softener, where necessary. In addition, the rubber composition may contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of its high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both the white pigment and the blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The filler blended in the rubber composition is used as a weight adjusting agent for adjusting the mass of the obtained crosslinked rubber molded product. The filler may be blended where necessary. Examples of the filler include an inorganic filler such as zinc oxide, barium sulfate, calcium carbonate, magnesium oxide, tungsten powder, and molybdenum powder.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

Preparation of Rubber Composition

The rubber composition used in the present disclosure is obtained by mixing and kneading (a) the base rubber, (b) the co-crosslinking agent, (c) the crosslinking initiator, (d) the benzothiazole derivative, (e) the organic sulfur compound, and other additives added where necessary. The kneading method is not particularly limited. For example, the kneading is conducted by using a conventional kneading machine such as a kneading roll, a banbury mixer, and a kneader.

The molar ratio ((d)/(c)) of the mole of (d) the benzothiazole derivative to the mole of (c) the crosslinking initiator in the rubber composition is preferably 0.5 or more, more preferably 1.0 or more, and even more preferably 1.5 or more, and is preferably 10 or less, more preferably 7 or less, and even more preferably 5 or less. If the molar ratio ((d)/(c)) is 0.5 or more, the obtained crosslinked rubber has further enhanced hardness, and if the molar ratio ((d)/(c)) is 10 or less, the obtained crosslinked rubber has better properties.

In the rubber composition, the mass ratio ((d)/(e)) of (d) the benzothiazole derivative to (e) the organic sulfur compound is preferably 0.5 or more, more preferably 1 or more, and even more preferably 1.5 or more, and is preferably 10 or less, more preferably 8 or less, and even more preferably 5 or less. If the mass ratio ((d)/(e)) is 0.5 or more, the crosslinking reaction can be effectively conducted, and if the mass ratio ((d)/(e)) is 10 or less, the obtained crosslinked rubber has better properties.

Properties of Rubber Composition

The ratio $\{(T2-T1)/(X-18)\}$ of the rubber composition is preferably 0.3 or more, more preferably 0.35 or more, even more preferably 0.4 or more, and most preferably 0.5 or more, wherein X is an amount (parts by mass) of (b) the co-crosslinking agent with respect to 100 parts by mass of (a) the base rubber, T1 is a torque (Nm) at 10 seconds and T2 is a torque (Nm) at 60 seconds from a start of measuring the torgue of the rubber composition when conducting a crosslinking test of the rubber composition at a temperature of 170° C. If the ratio $\{(T2-T1)/(X-18)\}$ is 0.3 or more, the crosslinking is effectively formed.

The difference (T2−T1) is preferably 2.5 or more, more preferably 3 or more, and even more preferably 4 or more, and is preferably 20 or less, more preferably 17 or less, and even more preferably 15 or less.

The slab hardness of the rubber composition is preferably 60 or more, more preferably 65 or more, and even more preferably 70 or more, and is preferably 100 or less, more preferably 95 or less, and even more preferably 90 or less in Shore C hardness.

[Crosslinked Rubber Molded Product]

The crosslinked rubber molded product according to the present disclosure is formed from the above-described rubber composition. The crosslinked rubber molded product is obtained by molding the kneaded rubber composition in a mold. The molding temperature is preferably 120° C. or more, more preferably 150° C. or more, and is preferably 250° C. or less. In addition, the molding pressure preferably ranges 2.9 MPa to 11.8 MPa. The molding time preferably ranges from 10 minutes to 60 minutes.

Examples of the crosslinked rubber molded product include a sports goods such as a golf ball, a tennis ball and a grip; an industrial goods such as a hose, a belt, and a mat; a sole, a tire, a resin additive, an anti-vibration rubber, and a fender. Examples of the golf ball include a golf ball comprising a constituent member formed from the above-described rubber composition.

EXAMPLES

Next, the present disclosure will be described in detail by way of examples. However, the present disclosure is not limited to the examples described below. Various changes and modifications without departing from the spirit of the present disclosure are included in the scope of the present disclosure.

[Evaluation Method]

(1) Crosslinking Test

An appropriate amount of samples was sampled from the rubber compositions, and vulcanization curves of the samples were measured with a curemeter (CURELASTO-METER Type 7 available from JSR Trading Co. Ltd.) at a temperature of 170° C. According to "9. Die vulcanization testing method A" of "Measurement of vulcanization characteristics with oscillating curemeters" specified in JIS K6300-2 (2001), a sinusoidal oscillation with a low amplitude was applied from a lower die to the rubber test piece in a manner that the sinusoidal oscillation did not destroy the rubber test piece, and a torque transmitted from the test piece to an upper die was measured from un-vulcanization state to over-vulcanization state. The measurement was conducted under conditions of a torsional vibration number: 100 times per minute, an amplitude angle: 1°, and a measuring time: 30 minutes.

(2) Slab Hardness (Shore C)

Sheets with a thickness of about 2 mm were produced by heat pressing at a temperature of 170° C. for 20 minutes. The test piece was stored at a temperature of 23 ±2° C. and a relative humidity of 50±5% for at least 12 hours. At least three of these sheets were stacked on one another so as not to be affected by the measuring substrate on which the sheets were placed, and the hardness of the stack was measured with an automatic hardness tester (Digitest II, available from Bareiss company) using a detector of "Shore C".

(3) Lupke Rebound Resilience (%)

The rebound resilience test was conducted according to JIS K6255 (2013). Sheets having a thickness of about 2 mm were prepared by heat press molding at a temperature of 170° C. for 20 minutes, round-shaped pieces having a diameter of 28 mm were punched from the sheets, and six of the round-shaped pieces were stacked to prepare a cylindrical test piece having a thickness of about 12 mm and a diameter of 28 mm. The test piece was stored at a temperature of 23 ±2° C. and a relative humidity of 50±5% for at least 12 hours. The rebound resilience of the obtained test piece was measured using a Lupke rebound resilience test measurement apparatus available from Ueshima Seisakusho Co., Ltd. The plane part of the above stacked test piece was held by a mechanical fixing method, and the measurement was conducted under conditions of a temperature: 23° C., a relative humidity: 50%, an impact end diameter: 12.50±0.05 mm, an impact mass: 0.35±0.01 kg, and an impact speed: 1.4 ±0.01 m/s.

[Preparation of Rubber Composition]

According to the formulations shown in Table 1 and Table 2, the materials were kneaded with a kneading roll, to prepare rubber compositions. The obtained rubber compositions were evaluated.

TABLE 1

| | Rubber composition No. | 1 | 2 | 3 | 4 | 5 | 6 | 7 | 8 | 9 |
|---|---|---|---|---|---|---|---|---|---|---|
| Formulation (parts by mass) | BR | 100 | 100 | 100 | 100 | 100 | 100 | 100 | 100 | 100 |
| | ZN-DA90S | 25 | 28 | 25 | 28 | 25 | 28 | 25 | 28 | 28 |
| | ZnO | 5 | 5 | 5 | 5 | 5 | 5 | 5 | 5 | 5 |
| | PCTP-Zn | 0.5 | 0.5 | 0.5 | 0.5 | 0.5 | 0.5 | 0.5 | 0.5 | — |
| | 5Cl-MBT | 1.21 | 1.21 | — | — | — | — | — | — | — |
| | 5F-MBT | — | — | 1.08 | 1.08 | — | — | — | — | — |
| | 5CF$_3$-MBT | — | — | — | — | 1.21 | 1.21 | — | — | — |
| | 6F-MBT | — | — | — | — | — | — | 1.21 | 1.21 | — |
| | 4Me-MBT | — | — | — | — | — | — | — | — | — |
| | 5Me-MBT | — | — | — | — | — | — | — | — | — |
| | 4Cl-MBT | — | — | — | — | — | — | — | — | — |
| | DCP | 0.80 | 0.80 | 0.8 | 0.8 | 0.8 | 0.8 | 0.8 | 0.8 | 0.8 |
| Crosslinking test | Torque T1 (N · m) at 10 seconds | 0.22 | 0.22 | 0.22 | 0.22 | 0.22 | 0.22 | 0.22 | 0.22 | 0.21 |
| | Torque T2 (N · m) at 60 seconds | 4.73 | 8.20 | 5.82 | 7.90 | 2.80 | 3.60 | 2.97 | 4.35 | 11.20 |
| | Difference (T2 − T1) | 4.50 | 7.98 | 5.60 | 7.69 | 2.58 | 3.39 | 2.75 | 4.13 | 10.99 |
| | Ratio {(T2 − T1)/(X − 18)} | 0.64 | 0.80 | 0.80 | 0.77 | 0.37 | 0.34 | 0.39 | 0.41 | 1.10 |
| Slab properties | Hardness (Shore C) | 78.5 | 83.3 | 79.0 | 82.0 | 77.2 | 81.6 | 77.8 | 81.7 | 81.6 |
| | Rebound resilience (%) | 67.2 | 63.6 | 67.2 | 64.9 | 70.3 | 67.0 | 68.2 | 64.9 | 64.3 |

TABLE 2

| | Rubber composition No. | 10 | 11 | 12 | 13 | 14 | 15 | 16 | 17 | 18 | 19 |
|---|---|---|---|---|---|---|---|---|---|---|---|
| Formulation (parts by mass) | BR | 100 | 100 | 100 | 100 | 100 | 100 | 100 | 100 | 100 | 100 |
| | ZN-DA90S | 26 | 28 | 29 | 32 | 25 | 28 | 25 | 28 | 25 | 28 |
| | ZnO | 5 | 5 | 5 | 5 | 5 | 5 | 5 | 5 | 5 | 5 |
| | PCTP-Zn | 0.5 | 0.5 | 0.5 | 0.5 | 0.5 | 0.5 | 0.5 | 0.5 | 0.5 | 0.5 |
| | 5Cl-MBT | — | — | — | — | — | — | — | — | — | — |
| | 5F-MBT | — | — | — | — | — | — | — | — | — | — |
| | 5CF$_3$-MBT | — | — | — | — | — | — | — | — | — | — |
| | 6F-MBT | — | — | — | — | — | — | — | — | — | — |
| | 4Me-MBT | — | — | — | — | 1.08 | 1.08 | — | — | — | — |
| | 5Me-MBT | — | — | — | — | — | — | 1.08 | 1.08 | — | — |

TABLE 2-continued

| Rubber composition No. | | 10 | 11 | 12 | 13 | 14 | 15 | 16 | 17 | 18 | 19 |
|---|---|---|---|---|---|---|---|---|---|---|---|
| Crosslinking test | 4Cl-MBT | — | — | — | — | — | — | — | — | 1.21 | 1.21 |
| | DCP | 0.8 | 0.8 | 0.8 | 0.8 | 0.8 | 0.8 | 0.8 | 0.8 | 0.8 | 0.8 |
| | Torque T1 (N · m) at 10 seconds | 0.22 | 0.23 | 0.22 | 0.22 | 0.23 | 0.23 | 0.22 | 0.22 | 0.23 | 0.22 |
| | Torque T2 (N · m) at 60 seconds | 2.56 | 3.03 | 3.27 | 4.36 | 1.33 | 1.51 | 1.58 | 1.88 | 1.72 | 1.97 |
| | Difference (T2 − T1) | 2.34 | 2.80 | 3.05 | 4.14 | 1.10 | 1.29 | 1.36 | 1.67 | 1.49 | 1.75 |
| | Ratio {(T2 − T1)/(X − 18)} | 0.29 | 0.28 | 0.28 | 0.30 | 0.16 | 0.13 | 0.19 | 0.17 | 0.21 | 0.18 |
| Slab properties | Hardness (Shore C) | 77.6 | 79.9 | 81.0 | 83.1 | 63.6 | 67.3 | 76.5 | 80.2 | 67.5 | 71.7 |
| | Rebound resilience (%) | 70.2 | 67.9 | 66.7 | 64.9 | 79.9 | 75.7 | 72.1 | 68.2 | 78.4 | 74.2 |

Materials used in Tables 1 and 2 are shown as follows.

BR: "BR730" (high-cis polybutadiene rubber (cis-1,4 bond content=96 mass %, 1,2-vinyl bond content=1.3 mass %, Moony viscosity ($ML_{1+4}$ (100° C.) =55, molecular weight distribution (Mw/Mn)=3)) available from JSR Corporation ZN-DA90S: zinc acrylate (including 10 mass % of zinc stearate) available from Nisshoku Techno Fine Chemical Co., Ltd.

ZnO: "Ginrei R" (zinc oxide) available from Toho Zinc Co., Ltd.

PCTP-Zn: zinc pentachlorothiophenol available from FUJIFILM Wako Chemicals Corporation 5Cl-MBT: 5-chloro-2-mercaptobenzothiazole available from Tokyo Chemical industry Co., Ltd.

5F-MBT: 5-fluoro-2-mercaptobenzothiazole available from Combi-Blocks Inc.

5CF3-MBT: 5-trifluoromethyl-2-mercaptobenzothiazole available from AA Blocks Inc.

6F-MBT: 6-fluoro-2-mercaptobenzothiazole available from BLD Pharmatech Inc.

4Me-MBT: 4-methyl-2-mercaptobenzothiazole available from Fluorochem Ltd.

5Me-MBT: 5-methyl-2-mercaptobenzothiazole available from Cool pharm Ltd.

4Cl-MBT: 4-chloro-2-mercaptobenzothiazole available from Fluorochem Ltd.

DCP: "Percumyl (register trademark) D" (dicumyl peroxide) available from NOF Corporation The slab hardness and the Lupke rebound resilience of the crosslinked rubber obtained from the rubber composition are shown in Tables 1 and 2. In addition, the relationship between the crosslinking time and the torque in the crosslinking test is shown in FIGS. 1 to 4.

Figure 1:
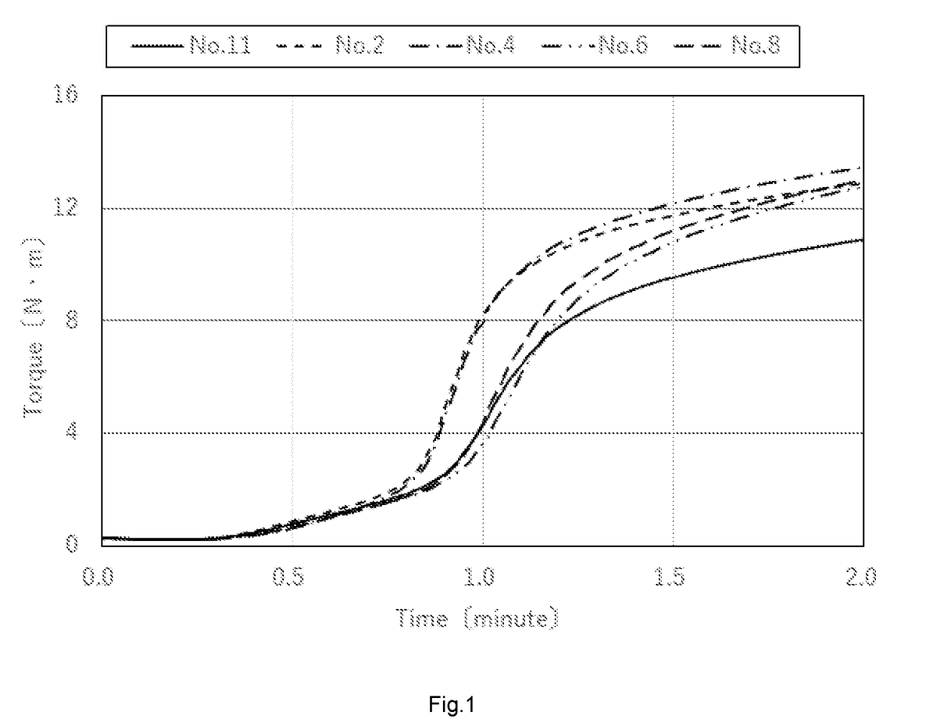
FIG. 1 shows a relationship between the crosslinking time and the torque of the rubber composition.
Figure 2:
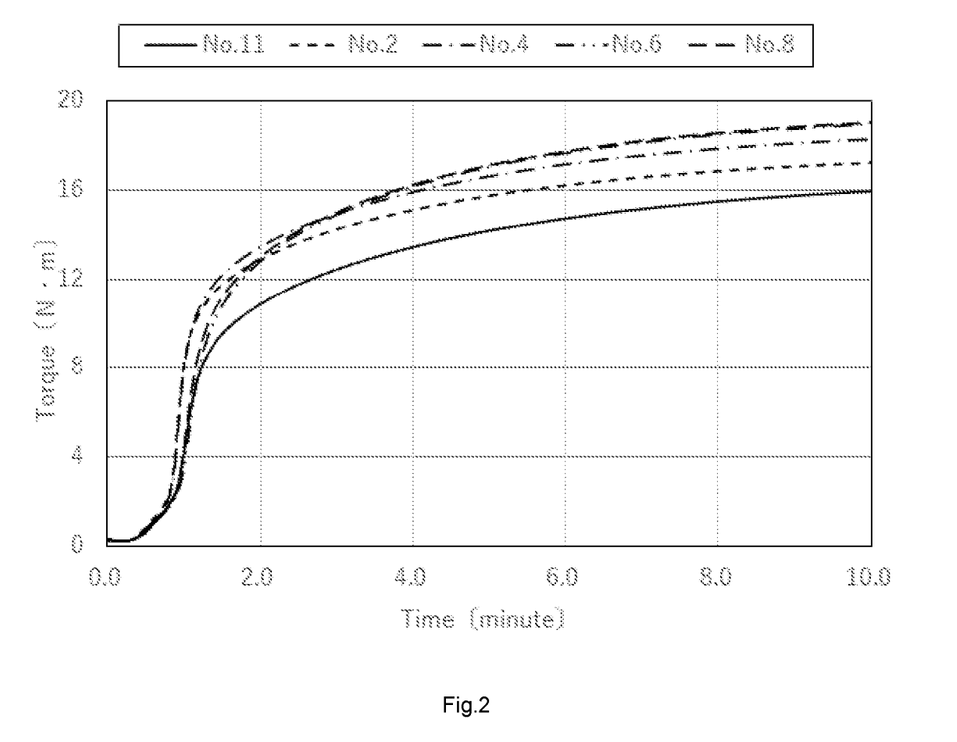
FIG. 2 shows a relationship between the crosslinking time and the torque of the rubber composition.
Figure 3:
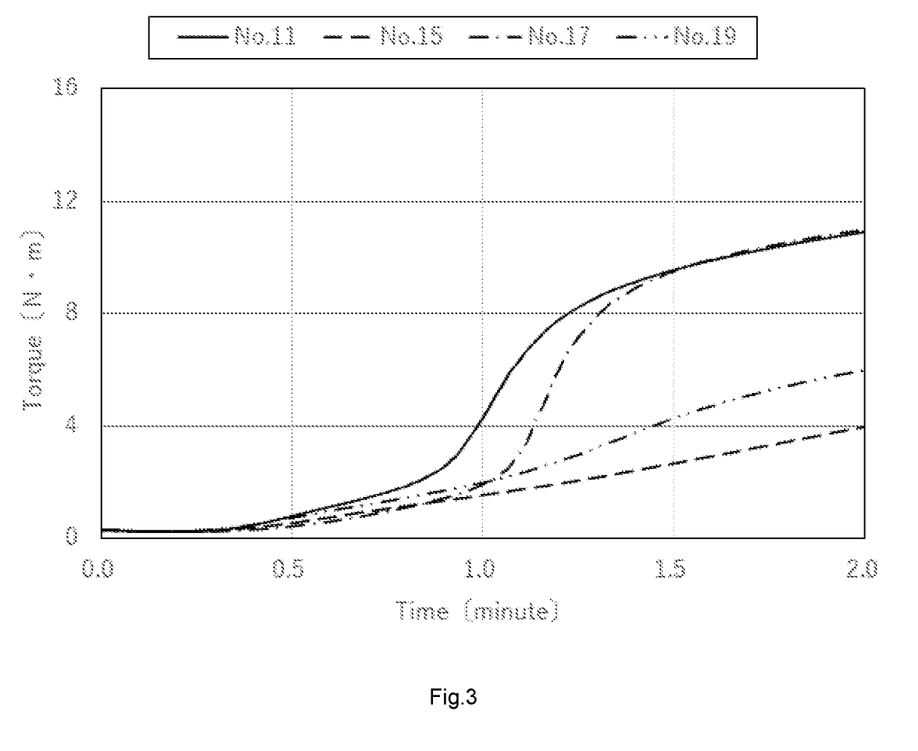
FIG. 3 shows a relationship between the crosslinking time and the torque of the rubber composition.
Figure 4:
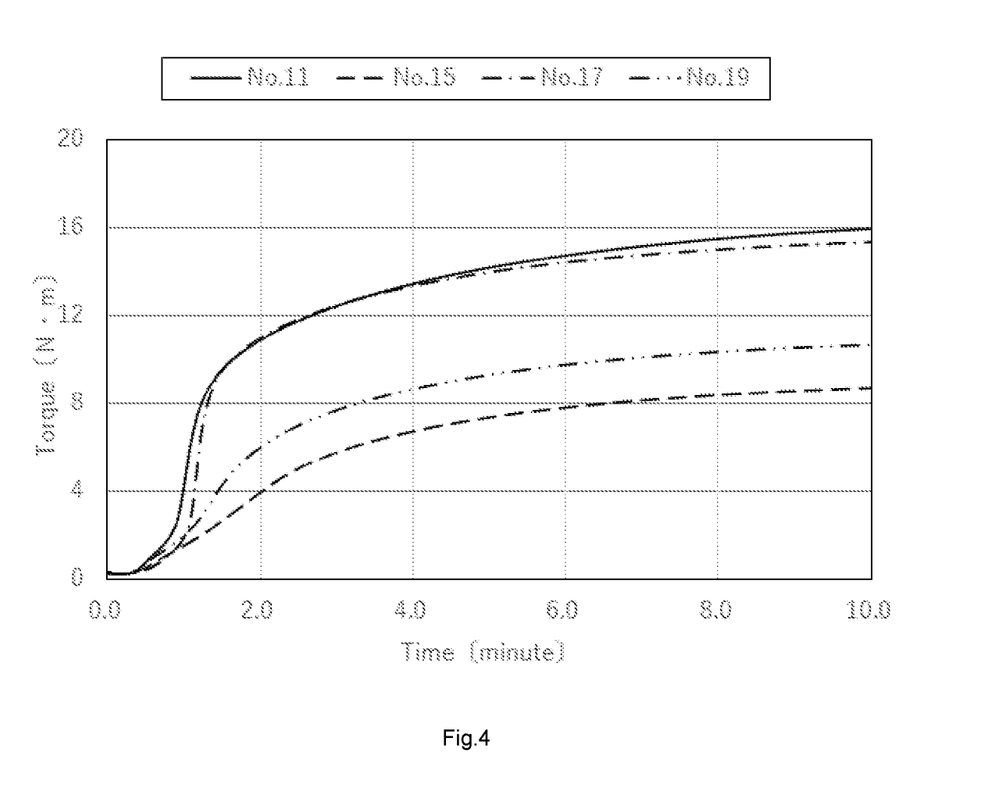
FIG. 4 shows a relationship between the crosslinking time and the torque of the rubber composition.
Figure 5:
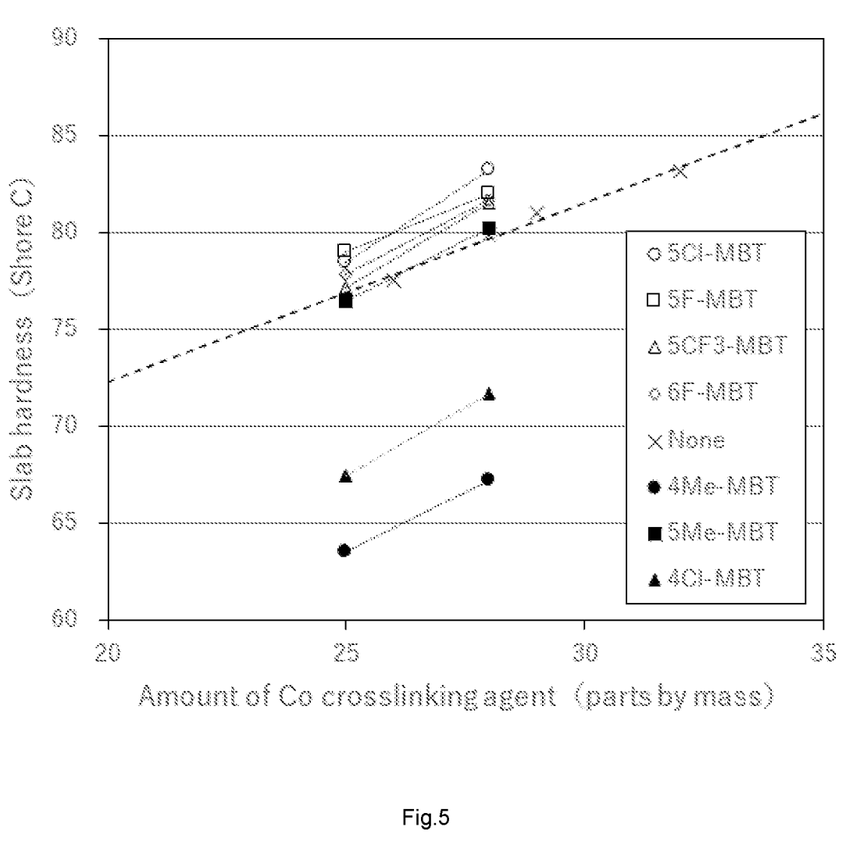
FIG. 5 shows a relationship between the amount of the co-crosslinking agent and the slab hardness of the rubber composition.
Figure 6:
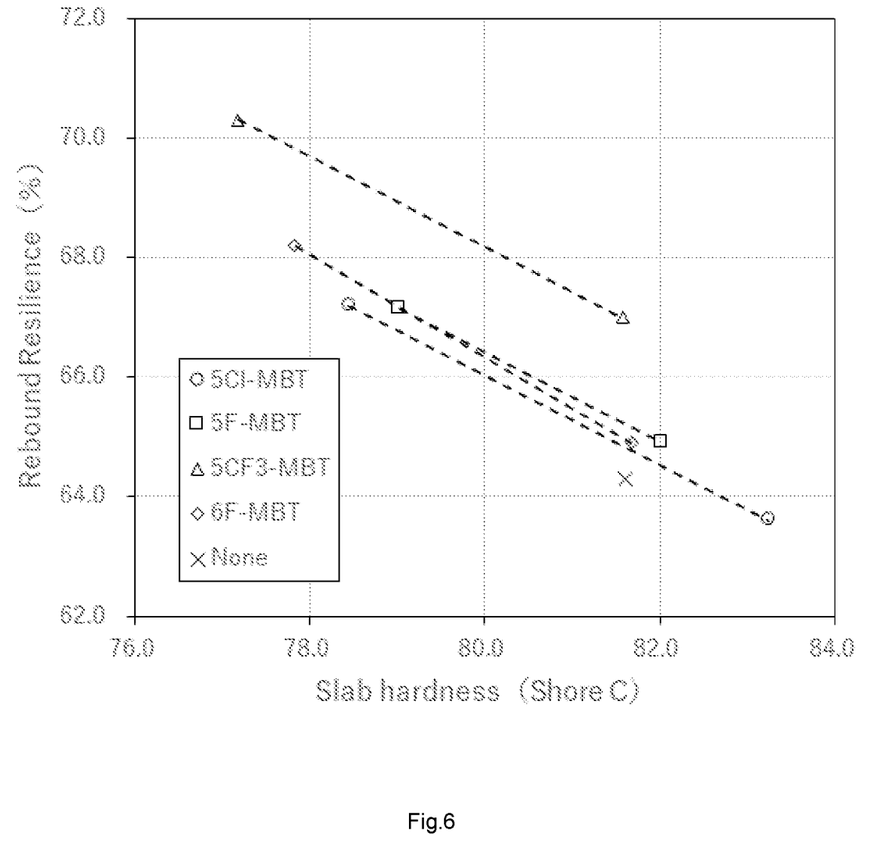
FIG. 6 shows a relationship between the slab hardness and the rebound resilience of the rubber composition.

In addition, FIG. 5 shows a relationship between the amount of the co-crosslinking agent and the slab hardness of the rubber composition; and FIG. 6 shows a relationship between the slab hardness and the rebound resilience of the rubber composition. It is noted that the broken line in FIG. 5 is a linear approximation curve regarding the rubber compositions No. 10 to 13. As shown in FIG. 5, in case that the type of the materials contained in the rubber composition is same, there is a tendency that the slab hardness is higher when the amount of the co-crosslinking agent is greater. Thus, it can be said that the hardness improvement effect due to (d) the benzothiazole derivative is higher when the hardness is higher at the same amount of the co-crosslinking agent. In addition, as shown in FIG. 6, there is a tendency that the rebound resilience is lower when the slab hardness of the rubber composition is higher. Thus, it can be said that the rebound resilience of the rubber composition is more excellent when the rebound resilience is higher at the same slab hardness.

The rubber compositions No. 1 to 8 are the cases containing the compound represented by the formula (1) or formula (2) as (d) the benzothiazole derivative, in addition to (e) the organic sulfur compound. The rubber composition No. 9 is the case not containing (d) the benzothiazole derivative and (e) the organic sulfur compound. The rubber compositions No. 10 to 13 are the cases containing (e) the organic sulfur compound but not containing (d) the benzothiazole derivative. The rubber compositions No. 14 to 19 are the cases containing other benzothiazole compound different from the benzothiazole derivative represented by the formula (1) or formula (2).

As shown in FIG. 5, comparing the slab hardness at the same amount of the co-crosslinking agent indicates that the compositions (No. 1 to 8) containing (d) the benzothiazole derivative have a higher slab hardness than the compositions (No. 10 to 13) not containing (d) the benzothiazole derivative, regardless of the amount of the co-crosslinking agent. In addition, as shown in FIG. 6, comparing the rubber compositions No. 1 to 8 with the rubber composition No. 9 indicates that the rubber compositions No. 1 to 8 also have higher rebound resilience than the rubber composition No. 9. Further, the rubber compositions No. 1 to 8 have a ratio {(T2−T1)/(X−18)} of 0.3 or more and have a higher crosslinking speed.

Comparing the rubber composition No. 11 with the rubber composition No. 9 indicates that the rubber composition No. 11 containing (e) the organic sulfur compound has a higher rebound resilience but a lower hardness than the rubber composition No. 9.

Among the compositions (No. 14 to 19) containing other benzothiazole compound, the compositions containing 4Me-MBT or 4Cl-MBT have a lower slab hardness than the compositions (No. 10 to 13) not containing (d) the benzothiazole derivative, regardless of the amount of the co-crosslinking agent. In addition, the composition containing 5Me-MBT has an enhanced slab hardness when the amount of the co-crosslinking agent is 28 parts by mass but has a lowered slab hardness when the amount of the co-crosslinking agent is 25 parts by mass.

The present disclosure (1) is a rubber composition containing (a) a base rubber, (b) a co-crosslinking agent, (c) a crosslinking initiator, (d) a benzothiazole derivative, and (e) an organic sulfur compound, wherein (d) the benzothiazole derivative includes a compound represented by the formula (1) and/or a compound represented by the formula (2).

(1)

(2)

[$R^1$ represents a hydrogen atom, an alkyl group having 1 to 8 carbon atoms, an aryl group having 4 to 14 carbon atoms, or a metal atom, $R^2$ to $R^5$ are identical to or different from each other, and represent an electron-withdrawing group or a hydrogen atom, and at least one of $R^3$ to $R^5$ is an electron-withdrawing group.]

The present disclosure (2) is the rubber composition according to the present disclosure (1), wherein an amount of (d) the benzothiazole derivative ranges from 0.01 part by mass to 20 parts by mass with respect to 100 parts by mass of (a) the base rubber.

The present disclosure (3) is the rubber composition according to the present disclosure (1) or (2), wherein (e) the organic sulfur compound includes at least one compound selected from the group consisting of thiophenols, thionaphthols, polysulfides, thiurams, thiocarboxylic acids, dithiocarboxylic acids, sulfenamides, dithiocarbamates, thiazoles, and metal salts thereof.

The present disclosure (4) is the rubber composition according to any one of the present disclosures (1) to (3), wherein a mass ratio ((d)/(e)) of (d) the benzothiazole derivative to (e) the organic sulfur compound ranges from 0.5 to 10.

The present disclosure (5) is the rubber composition according to any one of the present disclosures (1) to (4), wherein (b) the co-crosslinking agent includes an α,β-unsaturated carboxylic acid having 3 to 8 carbon atoms and/or a metal salt thereof.

The present disclosure (6) is the rubber composition according to any one of the present disclosures (1) to (5), wherein an amount of (b) the co-crosslinking agent is more than 18 parts by mass and 50 parts by mass or less with respect to 100 parts by mass of (a) the base rubber.

The present disclosure (7) is the rubber composition according to any one of the present disclosures (1) to (6), wherein a relationship of $\{(T2-T1)/(X-18)\}\geq 0.3$ is satisfied, wherein X is an amount (parts by mass) of (b) the co-crosslinking agent with respect to 100 parts by mass of (a) the base rubber in the rubber composition, T1 is a torque (Nm) at 10 seconds and T2 is a torque (Nm) after 60 seconds from a start of measuring the torque of the rubber composition when conducting a crosslinking test of the rubber composition at a temperature of 170° C.

The present disclosure (8) is a crosslinked rubber molded product formed from the rubber composition according to any one of the present disclosures (1) to (7).

The present disclosure (9) is a golf ball having a constituent member formed from the rubber composition according to any one of the present disclosures (1) to (7).

If the rubber composition according to the present disclosure is used, a crosslinking is formed in a short time to provide the crosslinked rubber molded product which has a high hardness. Thus, the rubber composition according to the present disclosure can be applied in a sports goods such as a golf ball, a tennis ball and a grip; an industrial goods such as a hose, a belt, and a mat; a sole, a tire, a resin additive, an anti-vibration rubber, a fender, and so on.

This application is based on Japanese Patent application No. 2021-180403 filed on Nov. 4, 2021, the content of which is hereby incorporated by reference.

The invention claimed is:

1. A rubber composition containing (a) a base rubber, (b) a co-crosslinking agent, (c) a crosslinking initiator, (d) a benzothiazole derivative, (e) an organic sulfur compound excluding (d) the benzothiazole derivative, and (f) a metal compound,
   wherein a mass ratio ((d)/(e)) of (d) the benzothiazole derivative to (e) the organic sulfur compound ranges from 1.5 to 10,
   a ratio (M2/(M1×valent)) of a mole M2 of (d) the benzothiazole derivative to a product obtained by multiplying a mole M1 of (f) the metal compound by a valent of the metal included in (f) the metal compound ranges from 0.04 to 1.0, and
   (d) the benzothiazole derivative includes a compound represented by the formula (1) and/or a compound represented by the formula (2):

(1)

(2)

wherein $R^1$ represents a hydrogen atom, an alkyl group having 1 to 8 carbon atoms, or an aryl group having 4 to 14 carbon atoms,
$R^2$ to $R^5$ are identical to or different from each other, and represent an electron-withdrawing group or a hydrogen atom, and at least one of $R^3$ to $R^5$ is an electron-withdrawing group.

2. The rubber composition according to claim 1, wherein an amount of (d) the benzothiazole derivative ranges from 0.01 part by mass to 20 parts by mass with respect to 100 parts by mass of (a) the base rubber.

3. The rubber composition according to claim 1, wherein (e) the organic sulfur compound excluding (d) the benzothiazole derivative is at least one compound selected from the group consisting of thiophenols, thionaphthols, polysulfides, thiurams, thiocarboxylic acids, dithiocarboxylic acids, sulfenamides, dithiocarbamates, thiazoles, and metal salts thereof.

4. The rubber composition according to claim 1, wherein (d) the benzothiazole derivative is a compound represented by the formula (1-1), (1-2), (2-1) or (2-2):

wherein $R^1$ represents a hydrogen atom, an alkyl group having 1 to 8 carbon atoms, or an aryl group having 4 to 14 carbon atoms,
$R^3$ represents an electron-withdrawing group,
$R^4$ represents an electron-withdrawing group.

5. The rubber composition according to claim 1, wherein (b) the co-crosslinking agent includes an α,β-unsaturated carboxylic acid having 3 to 8 carbon atoms and/or a metal salt thereof.

6. The rubber composition according to claim 1, wherein an amount of (b) the co-crosslinking agent is more than 18 parts by mass and 50 parts by mass or less with respect to 100 parts by mass of (a) the base rubber.

7. The rubber composition according to claim 1, wherein a relationship of $\{(T2-T1)/(X-18)\} \geq 0.3$ is satisfied, wherein X is an amount (parts by mass) of (b) the co-crosslinking agent with respect to 100 parts by mass of (a) the base rubber in the rubber composition, T1 is a torque (N·m) at 10 seconds and T2 is a torque (N·m) at 60 seconds from a start of measuring the torque of the rubber composition when conducting a crosslinking test at a temperature of 170° C.

8. A crosslinked rubber molded product formed from a rubber composition containing (a) a base rubber, (b) a co-crosslinking agent, (c) a crosslinking initiator, (d) a benzothiazole derivative, (e) an organic sulfur compound excluding (d) the benzothiazole derivative, and (f) a metal compound,
wherein a mass ratio ((d)/(e)) of (d) the benzothiazole derivative to (e) the organic sulfur compound ranges from 1.5 to 10,
a ratio (M2/(M1 ×valent)) of a mole M2 of (d) the benzothiazole derivative to a product obtained by multiplying a mole M1 of (f) the metal compound by a valent of the metal included in (f) the metal compound ranges from 0.04 to 1.0, and (d) the benzothiazole derivative includes a compound represented by the formula (1) and/or a compound represented by the formula (2):

wherein $R^1$ represents a hydrogen atom, an alkyl group having 1 to 8 carbon atoms, or an aryl group having 4 to 14 carbon atoms,
$R^2$ to $R^5$ are identical to or different from each other, and represent an electron-withdrawing group or a hydrogen atom, and at least one of $R^3$ to $R^5$ is an electron-withdrawing group.

9. The crosslinked rubber molded product according to claim 8, wherein an amount of (d) the benzothiazole derivative ranges from 0.01 part by mass to 20 parts by mass with respect to 100 parts by mass of (a) the base rubber.

10. The crosslinked rubber molded product according to claim 8, wherein (e) the organic sulfur compound excluding (d) the benzothiazole derivative includes at least one compound selected from the group consisting of thiophenols, thionaphthols, polysulfides, thiurams, thiocarboxylic acids, dithiocarboxylic acids, sulfenamides, dithiocarbamates, thiazoles, and metal salts thereof.

11. The crosslinked rubber molded product according to claim 8, wherein (d) the benzothiazole derivative is a compound represented by the formula (1-1), (1-2), (2-1) or (2-2):

-continued (2-2)

wherein R¹ represents a hydrogen atom, an alkyl group having 1 to 8 carbon atoms, or an aryl group having 4 to 14 carbon atoms,
R³ represents an electron-withdrawing group,
R⁴ represents an electron-withdrawing group.

12. The crosslinked rubber molded product according to claim 8, wherein (b) the co-crosslinking agent is an α,β-unsaturated carboxylic acid having 3 to 8 carbon atoms and/or a metal salt thereof.

13. The crosslinked rubber molded product according to claim 8, wherein an amount of (b) the co-crosslinking agent is more than 18 parts by mass and 50 parts by mass or less with respect to 100 parts by mass of (a) the base rubber.

14. The crosslinked rubber molded product according to claim 8, wherein a relationship of {(T2−T1)/(X−18)}≥0.3 is satisfied, wherein X is an amount (parts by mass) of (b) the co-crosslinking agent with respect to 100 parts by mass of (a) the base rubber in the rubber composition, T1 is a torque (N·m) at 10 seconds and T2 is a torque (N·m) at 60 seconds from a start of measuring the torque of the rubber composition when conducting a crosslinking test of the rubber composition at a temperature of 170° C.

15. A golf ball having a constituent member formed from a rubber composition containing (a) a base rubber, (b) a co-crosslinking agent, (c) a crosslinking initiator, (d) a benzothiazole derivative, (e) an organic sulfur compound excluding (d) the benzothiazole derivative, and (f) a metal compound,
wherein a mass ratio ((d)/(e)) of (d) the benzothiazole derivative to (e) the organic sulfur compound ranges from 1.5 to 10,
a ratio (M2/(M1×valent)) of a mole M2 of (d) the benzothiazole derivative to a product obtained by multiplying a mole M1 of (f) the metal compound by a valent of the metal included in (f) the metal compound ranges from 0.04 to 1.0, and
(d) the benzothiazole derivative includes a compound represented by the formula (1) and/or a compound represented by the formula (2):

(1)

(2)

wherein R¹ represents a hydrogen atom, an alkyl group having 1 to 8 carbon atoms, or an aryl group having 4 to 14 carbon atoms,
R² to R⁵ are identical to or different from each other, and represent an electron-withdrawing group or a hydrogen atom, and at least one of R³ to R⁵ is an electron-withdrawing group.

16. The golf ball according to claim 15, wherein an amount of (d) the benzothiazole derivative ranges from 0.01 part by mass to 20 parts by mass with respect to 100 parts by mass of (a) the base rubber.

17. The golf ball according to claim 15, wherein (e) the organic sulfur compound excluding (d) the benzothiazole derivative includes at least one compound selected from the group consisting of thiophenols, thionaphthols, polysulfides, thiurams, thiocarboxylic acids, dithiocarboxylic acids, sulfenamides, dithiocarbamates, thiazoles, and metal salts thereof.

18. The golf ball according to claim 15, wherein (d) the benzothiazole derivative is a compound represented by the formula (1-1), (1-2), (2-1) or (2-2):

(1-1)

(1-2)

(2-1)

(2-2)

wherein R¹ represents a hydrogen atom, an alkyl group having 1 to 8 carbon atoms, or an aryl group having 4 to 14 carbon atoms,
R³ represents an electron-withdrawing group,
R⁴ represents an electron-withdrawing group.

19. The golf ball according to claim 15, wherein (b) the co-crosslinking agent includes an α,β-unsaturated carboxylic acid having 3 to 8 carbon atoms and/or a metal salt thereof, an amount of (b) the co-crosslinking agent is more than 18 parts by mass and 50 parts by mass or less with respect to 100 parts by mass of (a) the base rubber.

20. The golf ball according to claim 15, wherein a relationship of {(T2−T1)/(X−18)}≥0.3 is satisfied, wherein X is an amount (parts by mass) of (b) the co-crosslinking agent with respect to 100 parts by mass of (a) the base rubber in the rubber composition, T1 is a torque (N·m) at 10 seconds and T2 is a torque (N·m) at 60 seconds from a start of measuring the torque of the rubber composition when conducting a crosslinking test of the rubber composition at a temperature of 170° C.

* * * * *